R. R. KITCHEL.
LAWN MOWER.
APPLICATION FILED SEPT. 24, 1920.
1,389,249.
Patented Aug. 30, 1921.
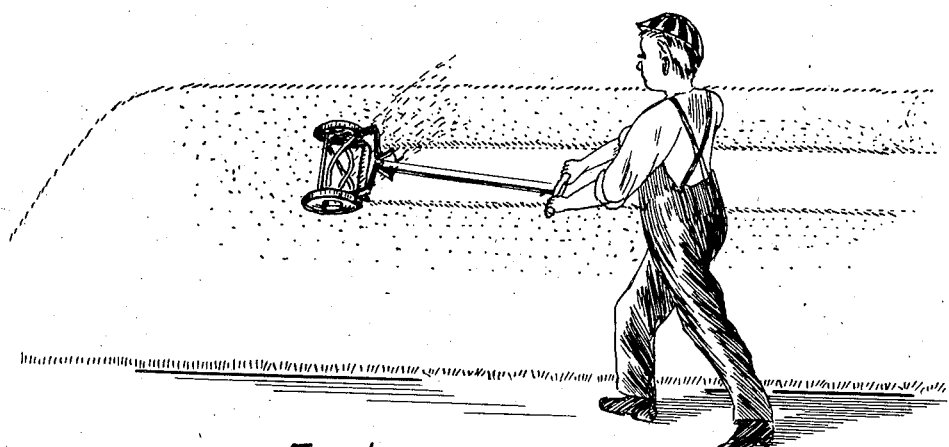
FIG.1.
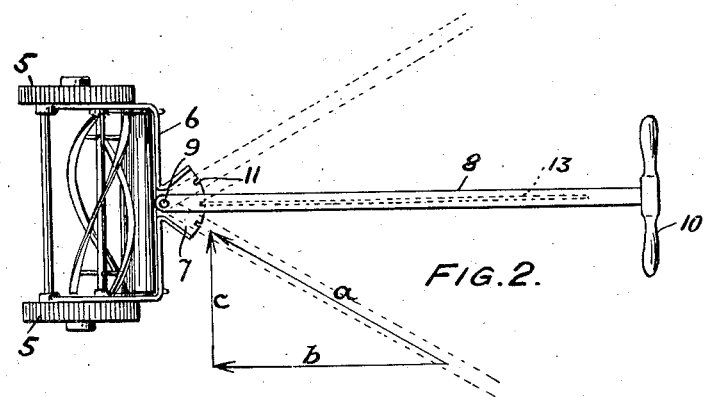
FIG.2.
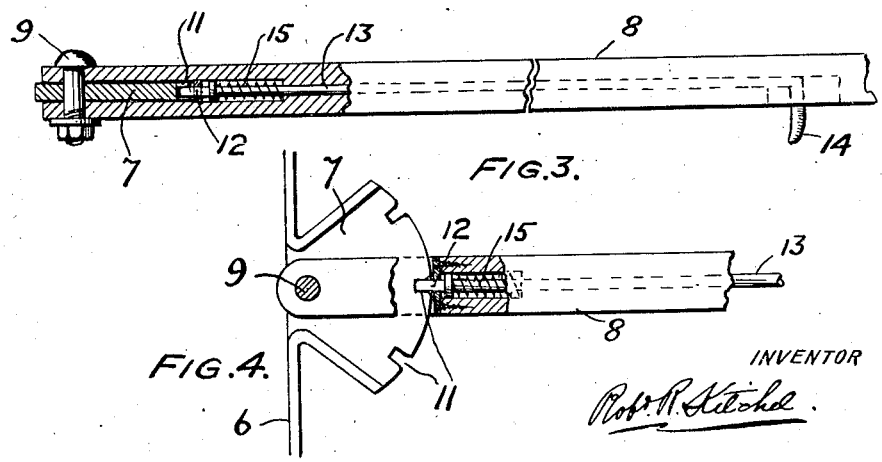
FIG.3.
FIG.4.
INVENTOR
Rob' R. Kitchel.

UNITED STATES PATENT OFFICE.

ROBERT R. KITCHEL, OF RIDLEY PARK, PENNSYLVANIA.

LAWN-MOWER.

1,389,249.   Specification of Letters Patent.   Patented Aug. 30, 1921.

Application filed September 24, 1920. Serial No. 412,521.

*To all whom it may concern:*

Be it known that I, ROBERT R. KITCHEL, a citizen of the United States, residing at Ridley Park, county of Delaware, and State of Pennsylvania, have invented a new and useful Improvement in Lawn-Mowers, of which the following is a full, clear, and exact description, reference being had to the accompanying drawings, which form a part of this specification.

My invention relates to lawn-mowers, rollers or the like, of the hand-pushed variety, and has for its object facilities for pushing the machine in a different path from that traveled by the operator.

The principal object of my invention is to enable an operator to cut or roll the grass upon a bank or terrace without himself being obliged to walk upon the inclined surface and support himself precariously as well as propel his machine along the slope.

Many lawns are broken by terraces of three or four feet in height and difficulty has always been encountered in caring for same due to the fact that the operator has been obliged to follow in the wake of the machine. Terraces should be trimmed longitudinally and it is usually necessary to cut several swaths along the inclined surface, where the operator is required to maintain his footing midway up the slope and propel his machine before him. The result is many slippings and much digging of heels into sod on each trip back and forth.

In my invention, I adjust the pushing handle of the mower at an angle to the blades, that is, I provide means for changing said angle thirty degrees or more, either side, from the central right-angle position, whereby the mower may be pushed along a path parallel to and several feet away from the path of the operator. Thus, the mower may be made to cut a longitudinal swath midway up a terrace while the operator is walking on the level at the foot of the terrace.

Other advantages of this angular displacement of the handle from the normal will be readily appreciated by anyone using my invention. It is possible with it to cut the top swath along a terrace by walking on the level at the top and pushing the machine at a lower level just over the ground. The angular setting will also be found convenient for trimming the grass where it grows in close to a hedge.

As the pushing handle is readily changeable from the normal to the angular position or back again, the machine can be used in the ordinary manner on lawns and all flat places, and when occasion arises the angular move may be made as desired.

Having thus described the function and object of my invention, I will now proceed with a detailed description, in connection with the accompanying drawings, in which:

Figure 1 is a picture view showing my improved lawn-mower in use.

Fig. 2 is a plan view of a lawn-mower embodying my invention.

Fig. 3 is a detail sectional view of the pivotal connection of the handle.

Fig. 4 is a plan view of same partly broken away.

This description and showing are in connection with a lawn-mower, but it is understood, as previously stated, that the idea may also be applied to rollers, etc.

The primary object of the invention is at once seen from Fig. 1. The machine comprises wheels 5 and a frame 6 carrying a quadrant 7. The handle 8 is pivoted at 9, the center of the quadrant, and extends out to the usual cross-piece 10.

The quadrant is provided with notches 11, one of which is in central line. The handle carries a centrally located latch 12 for coacting with notches 11 to hold the handle in any position set. The latch is connected to a rod 13, slidably carried by the handle and extending out to a point convenient to cross-piece 10, where it terminates in a trigger 14. A spring 15 is mounted in the handle, about rod 13, and tends to keep the latch 12 always pressed into one of the notches of the quadrant, from which it may be withdrawn by pulling on the trigger 14.

As the mower is shown in use in Fig. 1, the handle is turned to one side and the pushing force is applied in the direction of the arrow *a*, Fig. 2. This force is divisible into two components, the greater of which, *b*, pushes the mower ahead, and the lesser, *c*, at right angles to *b*, tends to press the mower up the incline, making it the more readily held to cut a horizontal swath.

When the operator gets to the end of his swath on the terrace, he simply pulls trigger 14 with his finger, releasing the latch and then turns his handle to the opposite side until the latch falls into the notch on that side, when he is ready to take a return cut either above or below his first one.

I have shown only a single notch 11 either side of the central one, but it is to be understood there may be more notches to allow setting at intermediate angles.

Having now fully described my invention, what I claim and desire to protect by Letters Patent is:—

1. In a lawn-mower, a cutting member in combination with a handle, a pivot in a plane normal to the axis of the cutting member, said handles mounted on said pivot to be adjustable sidewise, and means for fixing it in adjusted angular relation to said axis whereby the operator does not follow in the wake of his machine, for use on terraces.

2. In a lawn-mower, a cutting member in combination with a pushing member, a pivot for the pushing member in a plane at right angles to the cutting member, and means comprising a quadrant and a spring latch whereby the pushing member may be fixed in angular relation to the cutting member for cutting a swath at a distance from but parallel to the path of the operator.

3. A lawn-mower comprising a cutting member, a push-bar and a rigid cross-piece handle, a horizontally disposed quadrant and latching means for detachably securing the push-bar to said quadrant whereby the cross-piece handle may be set at different angles to the swath.

4. A lawn-mower for cutting terraces, comprising cutters, supporting wheels, a push-bar, a cross-piece handle rigidly secured at right angles to the push-bar, said push-bar being adjustable about a vertical pivot to form an angle with the axis of the cutters whereby said cross-piece handle may be so positioned that an extension thereof will form an acute angle with said axis, and means to secure said push-bar in set position.

5. A hand-pushed lawn-mower comprising a cutting member, a bail pivoted to the cutting member and a handle pivoted to the bail on an axis at right angles to that of the cutting member, in combination with a quadrant in the plane of the turning handle, notches in the quadrant, a spring plunger in the handle coacting with said notches, and means operable from the outer end of the handle to retract said plunger, whereby the operator may adjust the mower to cut a swath to one side of and parallel to his own path.

6. A lawn-mower having a cross-piece handle, a pivot in a vertical plane on which pivot the handle is mounted to turn from side to side, a self acting latch for fixing the handle in lateral angular position with respect to the mower, and means for withdrawing said latch whereby said angle can be changed when desired.

7. A lawn-mower comprising, in combination, cutters, a pivot in a vertical plane, a laterally swinging push-bar mounted on said pivot, a cross-piece handle immovably fixed to the end of said push-bar, and means for locking the push-bar in central or in lateral position for the purposes set forth.

In testimony of which invention, I have hereunto set my hand, at Philadelphia, on this 23rd day of September, 1920.

ROBERT R. KITCHEL.